US012001188B2

(12) United States Patent
Tao et al.

(10) Patent No.: US 12,001,188 B2
(45) Date of Patent: Jun. 4, 2024

(54) METHODS AND SYSTEMS OF FAST OPTIMIZATION AND COMPENSATION FOR VOLUMETRIC POSITIONING ERRORS OF ROTARY AXES OF FIVE-AXIS CNC MACHINE TOOLS

(71) Applicant: CHENGDU AIRCRAFT INDUSTRIAL (GROUP) CO., LTD., Sichuan (CN)

(72) Inventors: Wenjian Tao, Chengdu (CN); Jie Li, Chengdu (CN); Yunfeng Jiang, Chengdu (CN); Jinlong Hu, Chengdu (CN); Wenping Mou, Chengdu (CN); Zhiyong Song, Chengdu (CN); Ying Li, Chengdu (CN); Lianyu Li, Chengdu (CN); Wangwei Chu, Chengdu (CN)

(73) Assignee: CHENGDU AIRCRAFT INDUSTRIAL (GROUP) CO., LTD., Chengdu (CN)

( * ) Notice: Subject to any disclaimer, the term of this patent is extended or adjusted under 35 U.S.C. 154(b) by 0 days.

(21) Appl. No.: 18/452,506

(22) Filed: Aug. 18, 2023

(65) Prior Publication Data
US 2023/0400830 A1 Dec. 14, 2023

Related U.S. Application Data

(63) Continuation-in-part of application No. PCT/CN2021/136930, filed on Dec. 10, 2021.

(30) Foreign Application Priority Data

Feb. 18, 2021 (CN) .......................... 202110187158.4

(51) Int. Cl.
G05B 19/404 (2006.01)

(52) U.S. Cl.
CPC .. *G05B 19/404* (2013.01); *G05B 2219/32333* (2013.01)

(58) Field of Classification Search
None
See application file for complete search history.

(56) References Cited

U.S. PATENT DOCUMENTS 5,117,169 A * 5/1992 Kakino ............... G05B 19/401
318/578
5,841,668 A 11/1998 Pahk et al.
(Continued)

FOREIGN PATENT DOCUMENTS

| CN | 103390082 A | 11/2013 |
|---|---|---|
| CN | 103831665 A | 6/2014 |

(Continued)

OTHER PUBLICATIONS

International Search Report in PCT/CN2021/136930 dated Mar. 9, 2022, 8 pages.
(Continued)

*Primary Examiner* — Jason Lin
(74) *Attorney, Agent, or Firm* — Porus IP LLC

(57) ABSTRACT

Embodiments of the present disclosure provide a method of fast optimization and compensation for volumetric positioning errors of rotary axes of a five-axis CNC system machine tool. The method comprises: establishing a volumetric positioning error model; forming an error database containing 12 geometrical error vectors; constructing a volumetric positioning error compensation table; establishing a compensation value optimization model; completing an iterative optimization of compensation values of volumetric positioning errors; generating a volumetric positioning error compensation file for a CNC system to complete compensation for the volumetric positioning errors; and updating the error database, detecting linkage trajectories of the rotary axes, and (Continued)

setting a linkage trajectory positioning error threshold, and guaranteeing accuracy by iteratively implementing detection, optimization, and compensation.

9 Claims, 10 Drawing Sheets

(56) References Cited

U.S. PATENT DOCUMENTS

| | | | | |
|---|---|---|---|---|
| 6,592,430 | B1* | 7/2003 | Nakasuji | G05B 19/404 451/10 |
| 6,701,212 | B2* | 3/2004 | Shiba | G05B 19/404 700/192 |
| 7,571,669 | B2* | 8/2009 | Eba | G05B 19/184 82/133 |
| 8,396,697 | B2* | 3/2013 | Yang | G01B 21/042 703/2 |
| 8,680,806 | B2* | 3/2014 | Mori | G05B 19/404 318/632 |
| 9,983,563 | B2* | 5/2018 | Kondo | G05B 19/402 |
| 10,437,224 | B2* | 10/2019 | Shimizu | G05B 19/404 |
| 2012/0253505 | A1* | 10/2012 | Matsushita | G05B 19/401 700/193 |
| 2015/0160049 | A1* | 6/2015 | Oki | G01B 5/20 702/97 |
| 2019/0025051 | A1 | 1/2019 | Lee et al. | |
| 2020/0282503 | A1 | 9/2020 | Liu et al. | |

FOREIGN PATENT DOCUMENTS

| | | |
|---|---|---|
| CN | 103878641 A | 6/2014 |
| CN | 105136031 A | 12/2015 |
| CN | 105269406 A | 1/2016 |
| CN | 105371793 A | 3/2016 |
| CN | 105479268 A | 4/2016 |
| CN | 106141814 A | 11/2016 |
| CN | 106325207 A | 1/2017 |
| CN | 106363465 A | 2/2017 |
| CN | 108693774 A | 10/2018 |
| CN | 109765848 A | 5/2019 |
| CN | 109773585 A | 5/2019 |
| CN | 109933918 A | 6/2019 |
| CN | 111665784 A | 9/2020 |
| CN | 111913437 A | 11/2020 |
| CN | 112008492 A | 12/2020 |
| CN | 112059722 A | 12/2020 |
| CN | 112526927 A | 3/2021 |
| JP | 2016083729 A | 5/2016 |
| JP | 2017027360 A | 2/2017 |
| KR | 20110103221 A | 9/2011 |
| KR | 20190030819 A | 3/2019 |

OTHER PUBLICATIONS

Written Opinion in PCT/CN2021/136930 dated Mar. 9, 2022, 10 pages.

Tao, Wenjian, Research on Surface Mechanism of Test Specimen for Five-axis CNC Machine Tools, China Excellent Master's Dissertation Full-text Database Engineering Technology I Series, 2016, 77 Pages.

Li, Jie et al., Multi-axis Linkage Accuracy Detection Method of CNC Machine Tools Based on Built-in Sensors, Manufacturing Technology and Machine Tools, 8: 35-40, 2020.

Liang, Yingying, Geometric Error Modeling, Detection and Identificationin of Five-axis CNC Machine Tool, China Excellent Master's Dissertation Full-text Database Engineering Technology I Series, 2017, 91 Pages.

Liu, Jian, The Design of Rotation Axis Error Measurement System for R-Test of Five-Axis CNC Machine Tool, China Excellent Master's Dissertation Full-text Database Engineering Technology I Series, 2018, 67 Pages.

Chen, Rigao et al., Measurement of Static Geometric Error of Rotary Axis of Five-axis Machine Tool Based on Probe, 2018 IEEE International Conference on Information and Automation (ICIA), 939-944, 2018.

First Office Action in Chinese Application No. 202110187158.4 dated Mar. 26, 2021, 15 pages.

Decision to Grant a Patent in Chinese Application No. 202110187158.4 dated Apr. 14, 2021, 6 pages.

* cited by examiner

METHODS AND SYSTEMS OF FAST OPTIMIZATION AND COMPENSATION FOR VOLUMETRIC POSITIONING ERRORS OF ROTARY AXES OF FIVE-AXIS CNC MACHINE TOOLS

CROSS-REFERENCE TO RELATED APPLICATIONS

This application is a continuation-in-part of International Application No. PCT/CN2021/136930, filed on Dec. 10, 2021, which claims priority to Chinese Patent Application No. 202110187158.4, filed on Feb. 18, 2021, the entire contents of each of which are hereby incorporated by reference.

TECHNICAL FIELD

The present disclosure relates to the field of accuracy compensation for five-axis computer numerical control (CNC) machine tools, and in particular, to a method of fast optimization and compensation for volumetric positioning errors of rotary axes of a five-axis CNC machine tool.

BACKGROUND

A five-axis computer numerical control (CNC) machine tool is a core device for processing large and complex curved parts. The machining accuracy of the five-axis CNC machine tool directly determines the quality of machined parts. As the five-axis CNC machine tool has two more rotary axes than the three-axis machine tool, the addition of rotary axes brings machining advantages, but also brings more geometric error sources, making it difficult to effectively guarantee the machining accuracy of the five-axis CNC machine tool. Therefore, the way to improve the machining accuracy of the five-axis CNC machine tool has become a research focus of scholars at home and abroad.

At present, the five-axis CNC machine tool made in China is comparable to those made in Europe and the United States in guaranteeing accuracy for a translation axis, but a large gap exists in guaranteeing accuracy for a rotary axis. To improve the machining accuracy, the five-axis CNC machine tool focuses on improving the spatial accuracy of the rotary axis. Patent 201410352916 modeled and identified twelve geometric errors in the rotary axis of a rotary platform type, and then used a geometric error compensation value to correct a CNC instruction to achieve the compensation effect. However, there are two shortcomings in this compensation method. The first one is an identified geometric error of the rotary axis, a value of which still exists in an operating error and an identification error, which cannot be directly used in the compensation for the geometric error. The second one is a way of correcting the CNC instruction, which has a good effect but is not suitable for large and complex parts. This is because the number of lines of CNC instructions for large and complex parts is counted from 100,000, making the way of correcting the CNC instruction too inefficient. Patent 201610045130.6, based on the RTCP motion control function, completed the identification of twelve geometric errors of a rotary axis of a CA double pendulum head machine tool. An inspection tooling is additionally arranged, so the geometric error identified by this method may also be affected by identification accuracy, tooling errors, etc., making the identified geometric error not directly used in the compensation for spatial accuracy of the rotary axis. In summary, identification and compensation for the geometric error of the rotary axis proposed in existing methods have certain limitations. It is desirable to provide a more adaptable method to improve spatial positioning accuracy of the rotary axis.

In order to overcome the limitations of the existing methods, based on an identification result of a geometric error of a rotary axis, and in combination with a mathematical model of a volumetric positioning error of a rotary axis and a non-dominated sorting genetic algorithm (NSGAII algorithm), some embodiments of the present disclosure provide a method of fast optimization and compensation for volumetric positioning errors of rotary axes of a five-axis CNC machine tool, which achieves a fast compensation for spatial accuracy of rotary axes of the five-axis CNC machine tool, and realizes good implementation effect.

SUMMARY

One of the embodiments of the present disclosure provides a method of fast optimization and compensation for volumetric positioning errors of rotary axes of a five-axis CNC machine tool. The method may comprise: (1) establishing a volumetric positioning error model of rotary axes of the five-axis CNC machine tool based on the geometric errors of the rotary axes; (2) completing an identification of 12 geometric errors of the rotary axes based on instrument detection data to form an error database containing the 12 geometric error vectors; obtaining the instrument detection data using an inspection instrument, and obtaining identified values of geometric errors by performing the identification of the geometric errors using a relevant identification algorithm; wherein each of the 12 geometric error vectors may be an error vector combined by 6 geometric errors identified for each rotary axis of a rotary axis A and a rotary axis $$C: E_{1 \times 12} = [\underbrace{\delta_x(A), \ldots, \theta_y(A)}_{6}, \underbrace{\delta_x(C), \ldots, \theta_y(C)}_{6}];$$

each error term of the 12 geometric error vectors may be related to a motion position, and when a motion stroke of each rotary axis is divided into N equal parts, values of a same error term may be different at different rotation angle positions, and the error database may be noted as:

$$Ebase_{N \times 12} = \begin{bmatrix} \delta_x(A)_1, \ldots, \theta_y(A)_1, \delta_x(C)_1, \ldots, \theta_y(C)_1 \\ \ldots \\ \delta_x(A)_N, \ldots, \theta_y(A)_N, \delta_x(C)_N, \ldots, \theta_y(C)_N \end{bmatrix};$$

where $Ebase_{N \times 12}$ denotes a matrix of N rows and 12 columns; (3) decomposing the volumetric positioning errors of the rotary axes into linear correlation and nonlinear correlation, and constructing a volumetric positioning error compensation table of the rotary axes by combining with a sag error compensation function of a numerical control system; (4) adding correction coefficients k and d to the error database and correlating the correction coefficients k and d with a linkage trajectory positioning error model to establish a compensation value optimization model for the volumetric positioning errors, wherein the compensation value optimization model is used to optimize compensation values for the volumetric positioning errors of the rotary axes; (5) carrying out compensation quality control on correction coefficient vectors K and D composed of the correction coefficients k and d based on a non-dominated sorting genetic algorithm (NSGAII algorithm) to realize optimization selection of the correction coefficient vectors, so as to complete an iterative optimization of the compensation values for the volumetric positioning errors; (6) generating a volumetric positioning error compensation file for the CNC system by using the correction coefficient vectors and the error database obtained in step (5), so as to complete the compensation of the volumetric positioning errors; and (7) updating corrected geometric errors to the error database, and periodically detecting linkage trajectories of the rotary axes, and setting a linkage trajectory positioning error threshold, thereby guaranteeing spatial accuracy of the five-axis CNC machine tool by iteratively implementing detection, optimization, and compensation.

For any structure type of machine tool, compensation of the volumetric positioning errors of the rotary axes can be realized by adopting the fast optimization method in combination with the volumetric positioning error model of the rotary axes and the geometric error optimization model on the basis of the identified geometric errors of the geometric errors.

Some embodiments of the present disclosure include at least the following beneficial effects: (1) the method has higher operation convenience and detection efficiency: after the all-round identification is completed, detection and compensation of the volumetric positioning errors of the rotary axes can be completed by only implementing the CA-axis linkage trajectories, so that the linkage detection greatly improves the operation convenience compared to detection of an individual rotary axis, making the detection more efficient; (2) optimization and compensation have good adaptability: the geometric errors are optimized and then compensated, the requirements for the identification accuracy of the geometric errors are low, i.e., the geometric errors with low identification accuracy can also be compensated and corrected through the optimization of the present invention, which reduces the requirements for the identification accuracy of the geometric errors, the requirements for the accuracy of detection tooling, etc., and expands the adaptability of the present invention; (3) the present invention has a high degree of automation of fast optimization: compared to the conventional error correction method, which mostly repeats tests and directly averages the results of a plurality of experiments for compensation and correction, making the traditional method inefficient in implementation, the present method adopts an intelligent optimization algorithm, and performs refined correction for the geometric errors by using the powerful processing capability of the computer, thereby improving the quality of compensation, and facilitating fast compensation.

BRIEF DESCRIPTION OF THE DRAWINGS

The present disclosure is further illustrated in terms of exemplary embodiments. These exemplary embodiments are described in detail according to the drawings. These embodiments are non-limiting exemplary embodiments, in which like reference numerals represent similar structures, wherein.

DETAILED DESCRIPTION

Figure 1:
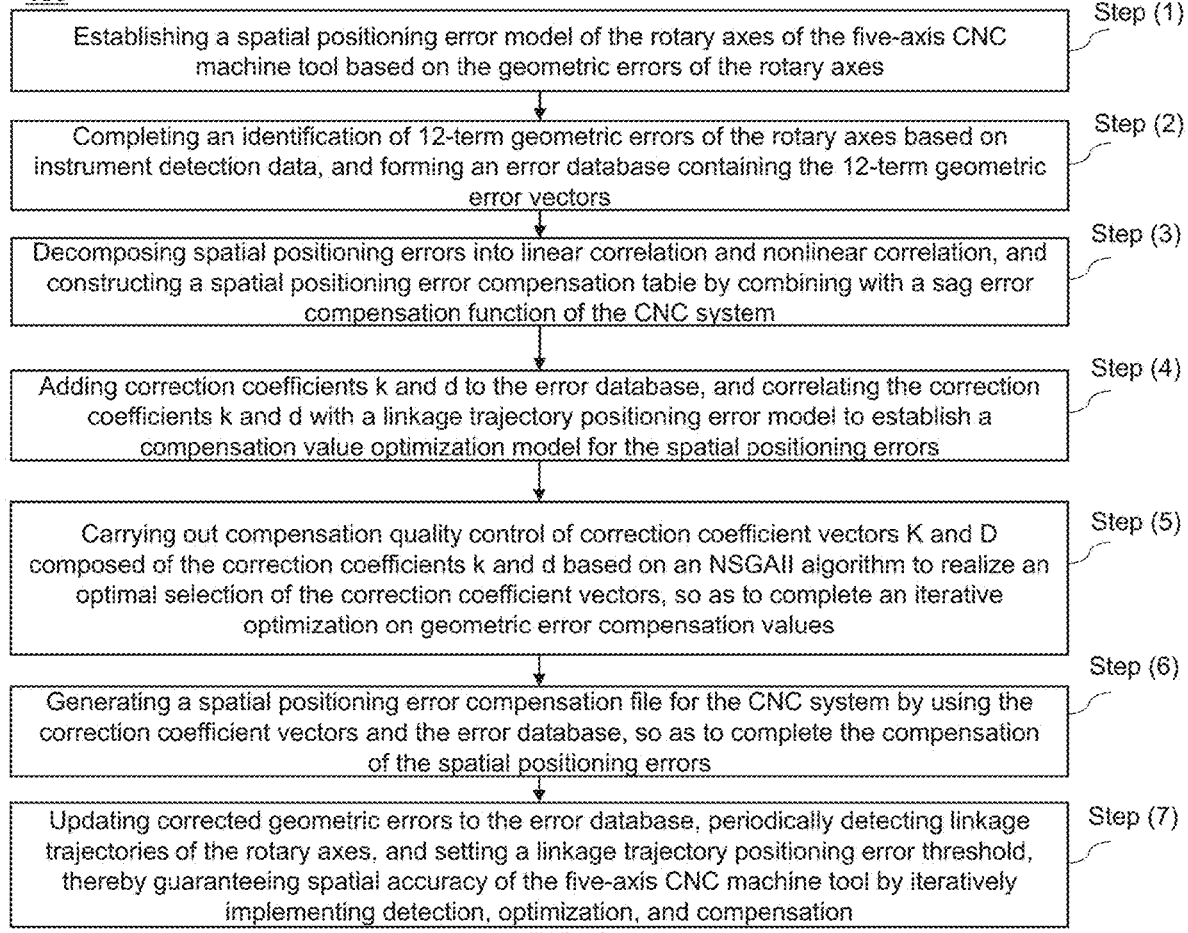
FIG. 1 is a flowchart illustrating an exemplary fast optimization of volumetric positioning errors of rotary axes of a five-axis CNC machine tool according to some embodiments of the present disclosure.

To more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that "system", "device", "unit" and/or "module" as used herein is a manner used to distinguish different components, elements, parts, sections, or assemblies at different levels. However, if other words serve the same purpose, the words may be replaced by other expressions.

As shown in the present disclosure and claims, the words "one", "a", "a kind" and/or "the" are not especially singular but may include the plural unless the context expressly suggests otherwise. In general, the terms "comprise," "comprises," "comprising," "include," "includes," and/or "including," merely prompt to include operations and elements that have been clearly identified, and these operations and elements do not constitute an exclusive listing. The methods or devices may also include other operations or elements.

The flowcharts used in the present disclosure illustrate operations that systems implement according to some embodiments of the present disclosure. It should be understood that the previous or subsequent operations may not be accurately implemented in order. Instead, each step may be processed in reverse order or simultaneously. Meanwhile, other operations may also be added to these processes, or a certain step or several steps may be removed from these processes.

FIG. 1 is a flowchart illustrating an exemplary fast optimization of volumetric positioning errors of rotary axes of a five-axis CNC machine tool according to some embodiments of the present disclosure. In some embodiments, a process 100 may be performed by a CNC system of the five-axis CNC machine tool. For example, the process 100 may be stored in a storage device of the CNC system in a form of a program or an instruction, and the process 100 may be implemented when a processing device of the CNC system executes the program or the instruction. A schematic diagram illustrating operation of the process 100 presented below is illustrative. In some embodiments, the process may be completed by one or more additional operations not described or one or more operations not discussed. Further, an order of the operations of the process 100 illustrated in FIG. 1 and described below is not limiting.

Step (1): a volumetric positioning error model of the rotary axes of the five-axis CNC machine tool may be established based on the geometric errors of the rotary axes.

Step (2): an identification of 12 geometric errors of the rotary axes may be completed based on instrument detection data, and an error database containing 12 geometric error vectors may be formed.

Step (3): the volumetric positioning errors may be decomposed into linear correlation and nonlinear correlation, and a volumetric positioning error compensation table of the rotary axes may be constructed by combining with a sag error compensation function of the CNC system.

Step (4): correction coefficients k and d may be added to the error database, and correlated with a linkage trajectory positioning error model to establish a compensation value optimization model for the volumetric positioning errors.

Step (5): compensation quality control may be performed on correction coefficient vector K and D composed of the correction coefficient k and d based on an NSGAII algorithm to realize optimization selection on the correction coefficient vectors, so as to complete an iterative optimization on compensation values for the volumetric positioning errors.

Step (6): a volumetric positioning error compensation file for the CNC system may be generated based on the correction coefficient vectors and the error database to implement compensation of the volumetric positioning errors.

Step (7): corrected geometric errors may be updated to the error database, linkage trajectories of the rotary axes may be periodically detected, a linkage trajectory positioning error threshold may be set, and spatial accuracy of the five-axis CNC machine tool may be guaranteed by cyclically implementing detection, optimization, and compensation.

Figure 2:
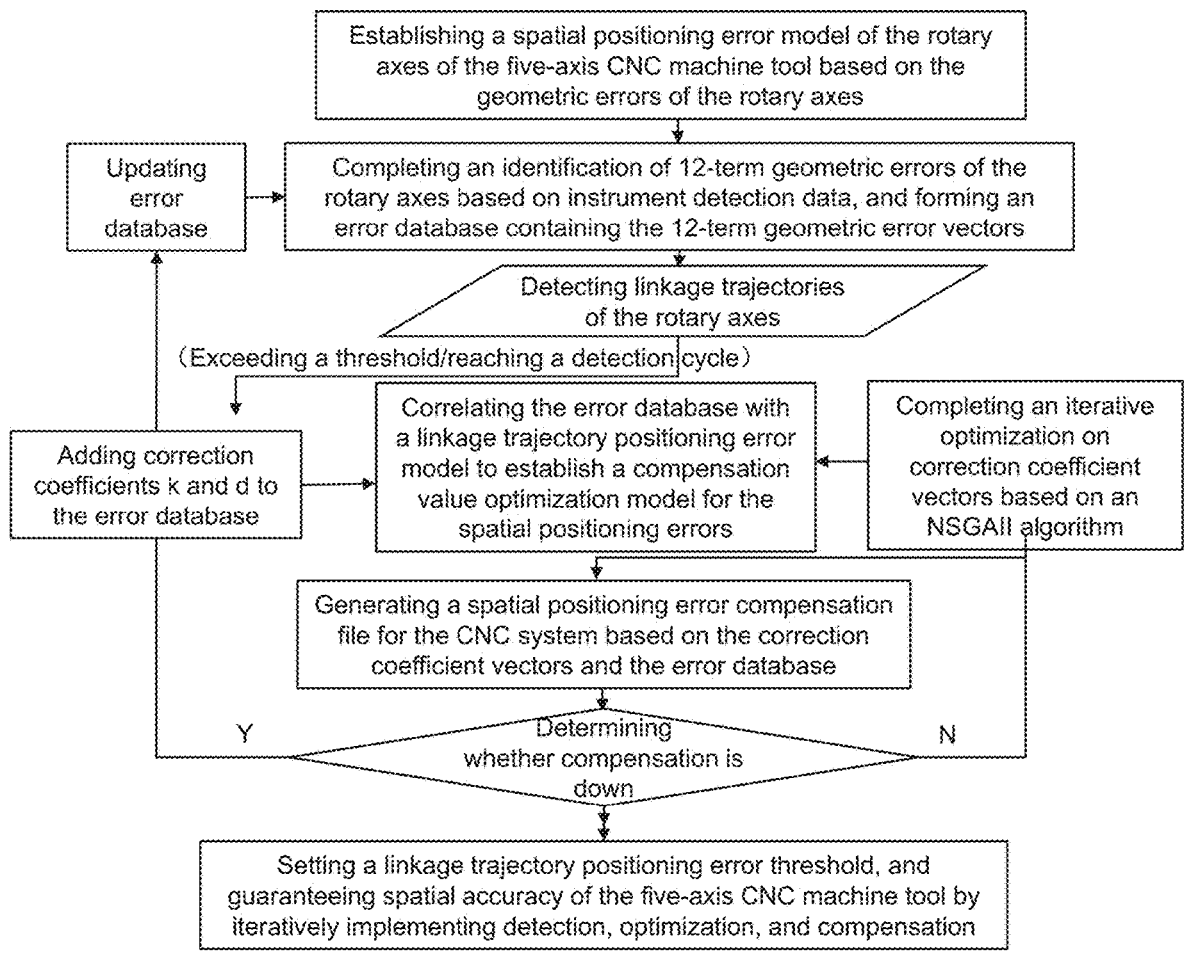
FIG. 2 is an exemplary flowchart illustrating fast optimization of volumetric positioning errors of rotary axes of a five-axis CNC machine tool according to some embodiments of the present disclosure.

Specific implementation steps of the method of fast optimization and compensation for the volumetric positioning errors are described below in conjunction with FIG. 2.

Step (1): The volumetric positioning error model of the rotary axes of the five-axis CNC machine tool may be established based on the geometric errors of the rotary axes.

Figure 3:
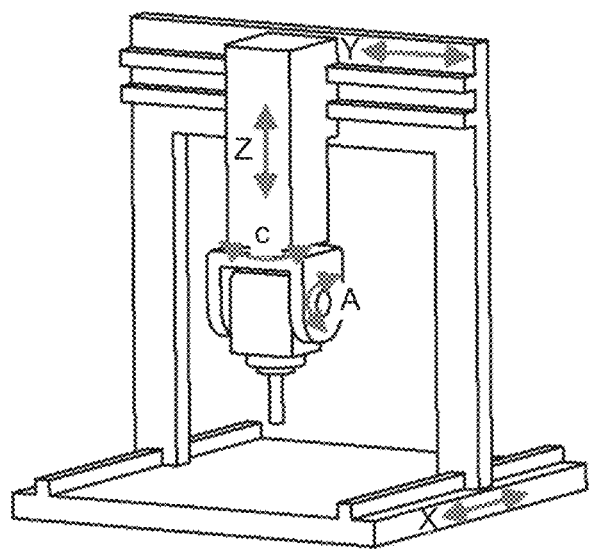
FIG. 3 is a schematic diagram illustrating an example of a CA vertical five-axis CNC machine tool according to some embodiments of the present disclosure.

A large gantry CA vertical five-axis CNC machine tool in FIG. 3 may be taken as an example.

Step (1.1): the geometric errors of the rotatory axes may be described.

Figure 4:
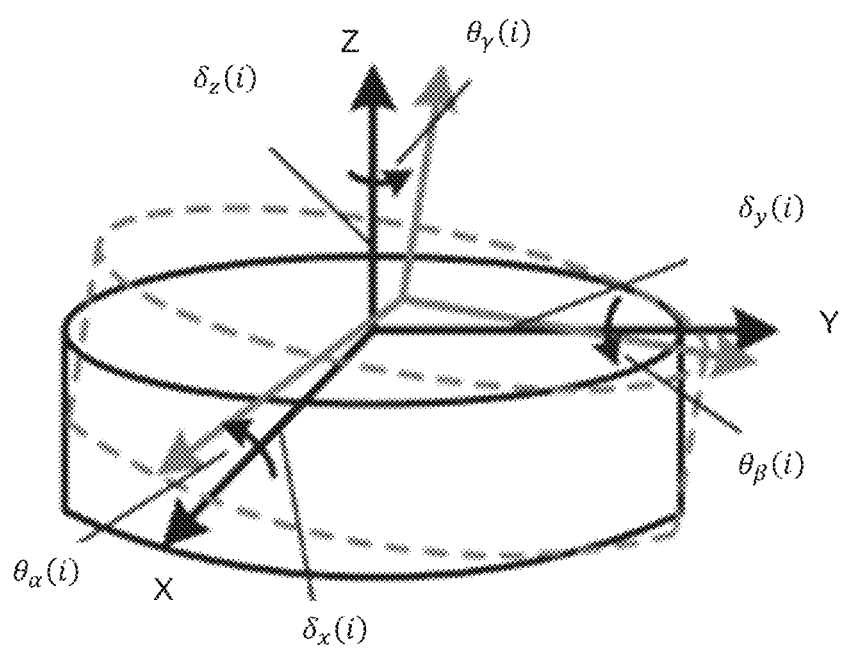
FIG. 4 is a schematic diagram illustrating a composition of geometric errors of rotary axes of a CNC machine tool according to some embodiments of the present disclosure.

For a rotary axis C (around a Z-axis), as shown in FIG. 4, the geometric errors of the rotary axis C may include six items, including three displacement deviation errors, i.e., a displacement error along an X-direction $\delta_x(C)$, a displacement error along a Y-direction $\delta_y(C)$, and a displacement error along a Z-direction $\delta_z(C)$, and three angular errors, i.e., an angular error around an X-axis $\theta_\alpha(C)$, an angular error around a Y-axis $\theta_\beta(C)$, and an angular error around a Z-axis $\theta_\gamma(C)$. For a certain rotary axis, a generic vector form of the geometric errors of the rotary axis may be as follows:

$$E(i)=[\delta_x(i),\delta_y(i),\delta_z(i),\theta_\alpha(i),\theta_\beta(i),\theta_\gamma(i)]^T, i=A,B,C;$$

Where A, B, and C denote the rotary axes and i denotes the rotary axis.

Step (1.2): the rotary axis may be driven to rotate by a CNC instruction, due to an influence of the geometric errors of the rotary axis, an actual motion matrix of the rotary axis may be as follows:

$$T_i=R(i)\cdot E_i, i=A,B,C$$

Where $T_i$ denotes an actual motion transformation matrix of the i-axis, R(i) denotes a theoretical motion transformation matrix of the rotary i-axis, and $E_i$ denotes a geometric error matrix, which may be specifically expressed as:

$$R(A) = \begin{bmatrix} 1 & 0 & 0 & 0 \\ 0 & \cos\sigma_A & -\sin\sigma_A & 0 \\ 0 & \sin\sigma_A & \cos\sigma_A & 0 \\ 0 & 0 & 0 & 1 \end{bmatrix}, R(B) = \begin{bmatrix} \cos\sigma_B & 0 & \sin\sigma_B & 0 \\ 0 & 1 & 0 & 0 \\ -\sin\sigma_B & 0 & \cos\sigma_B & 0 \\ 0 & 0 & 0 & 1 \end{bmatrix},$$

$$R(C) = \begin{bmatrix} \cos\sigma_C & -\sin\sigma_C & 0 & 0 \\ \sin\sigma_C & \cos\sigma_C & 0 & 0 \\ 0 & 0 & 1 & 0 \\ 0 & 0 & 0 & 1 \end{bmatrix},$$

$$E_i = \begin{bmatrix} 1 & -\theta_\gamma(i) & \theta_\beta(i) & \delta_x(i) \\ \theta_\gamma(i) & 1 & \theta_\alpha(i) & \delta_y(i) \\ -\theta_\beta(i) & \theta_\alpha(i) & 1 & \delta_z(i) \\ 0 & 0 & 0 & 1 \end{bmatrix}, i = A, B, C;$$

Where $\sigma_A$, $\sigma_B$, $\sigma_C$ denote an running angle of each rotary axis in the CNC instruction, respectively, $(\delta_x(i), \delta_y(i), \delta_z(i))$ denote displacement errors along X, Y, Z-direction, respectively, and $(\theta_\alpha(i), \theta_\beta(i), \theta_\gamma(i))$ denote angular errors around X, Y, Z-axis under a workpiece coordinate system.

Step (1.3): since the five-axis CNC machine tool has only two rotary axes involved in the motion, a kinematic relationship of a tool center point in the case of an error when a C-axis and an A-axis are in linkage operation may be obtained according to a topology of a CA five-axis CNC machine tool with double pendulum heads in combination with the error matrix and the motion matrix of the rotary axis in step (1.2) as follows:

$$P_{actual}=T(C)\cdot T(A)\cdot P_t;$$

Where $P_{actual}$ denotes actual coordinates of the tool center point under the workpiece coordinate system, $P_t$ denotes actual coordinates of the tool center point under a tool coordinate system, $P_t=[0\ 0\ -L\ 1]^T$, and L denotes a length of a tool.

Step (1.4): in step (1.2), (1.3), ignoring that the geometric error matrix is a theoretical motion model, a kinematic relationship of the tool center point in an ideal case may be obtained as follows:

$$P_{ideal}=R(C)\cdot R(A)\cdot P_t;$$

Where $P_{ideal}$ denotes theoretical coordinates of the tool center point under the workpiece coordinate system.

Step (1.5): combined with step (1.3) and step (1.4), the volumetric positioning error model of the rotary axes of the five-axis CNC machine tool may be obtained as follows:

$$P_{error}=F_{actual}-P_{ideal};$$

According to steps (1.2) to (1.4), an expression corresponding to the volumetric positioning errors of the tool center point of the large gantry five-axis CNC machine tool may be obtained by substituting and simplifying a motion variation matrix and the geometric error matrix $E_i$ as follows:

$$P_{error} = \begin{bmatrix} \delta_x(A)\cos\sigma_C - \delta_y(A)\sin\sigma_C - L\theta_\beta(A)\cos\sigma_A \\ \cos\sigma_C - L\theta_\alpha(A)\cos\sigma_A\sin\sigma_C - \\ L\theta_y(C)\sin\sigma_A\cos\sigma_C - L\theta_\beta(C)\cos\sigma_A - \\ L\theta_y(A)\sin\sigma_A\cos\sigma_C + \delta_x(C) \\ \delta_y(C) + \delta_x(A)\sin\sigma_C + L\theta_\alpha(C)\cos\sigma_A - \\ L\theta_y(A)\sin\sigma_A\sin\sigma_C + \delta_y(A)\cos\sigma_C + \\ L\theta_\alpha(A)\cos\sigma_A\cos\sigma_C - L\theta_y(C)\sin\sigma_A\sin\sigma_C - \\ L\theta_\beta(A)\cos\sigma_A\cos\sigma_C \\ L\theta_\beta(A)\sin\sigma_A\sin\sigma_C + L\theta_\alpha(C)\sin\sigma_A\cos\sigma_C + \\ L\theta_\alpha(A)\sin\sigma_A + \delta_z(C) + \delta_z(A) \\ 0 \end{bmatrix}$$

Step (2): the identification of 12 geometric errors of the rotary axes may be completed based on the instrument detection data, and the error database containing 12 geometric error vectors may be formed. Implementation steps are described in steps (2.1) to (2.2) below.

Step (2.1): the instrument detection data may be obtained by using a detection instrument (such as R-TEST, ball-bar, etc.), and the geometric errors may be identified by using a relevant identification algorithm to obtain the identified geometric errors of the geometric errors.

Step (2.2): each of the 12 geometric error vectors may be an error vector combined by 6 geometric errors identified for each rotary axis with a rotary axis A and a rotary axis C:

$$E_{1\times 12} = \left[ \underbrace{\delta_x(A), \ldots, \theta_y(A)}_{6}, \underbrace{\delta_x(C), \ldots, \theta_{yy}(C)}_{6} \right].$$

Since the geometric errors of the rotary axis is interrelated with a motion position, each error term may also become a position-related vector throughout a motion stroke. Each error term of the 12 geometric error vectors may be related to the motion position, i.e., when the motion stroke of the rotary axis is divided into N equal parts, values of a same error term may be different at different rotation angle positions, and the error database may be noted as:

$$Ebase_{N\times 12} = \begin{bmatrix} \delta_x(A)_1, \ldots, \theta_y(A)_1, \delta_x(C)_1, \ldots, \theta_{yy}(C)_1 \\ \ldots \\ \delta_x(A)_N, \ldots, \theta_y(A)_N, \delta_x(C)_N, \ldots, \theta_y(C)_N \end{bmatrix};$$

Where $Ebase_{N\times 12}$ denotes a matrix of N rows and twelve columns representing the error database of the geometric errors of the rotary axes of the five-axis machine tool.

In order to realize high precision and high efficiency machining of the five-axis CNC machine tool, it is necessary to compensate the geometric errors of the rotary axis, thereby reducing the influence of the volumetric positioning errors on the overall machining accuracy of the machine tool. Hereto, a volumetric positioning error compensation file may be generated by using a sag error compensation module of the CNC system.

Step (3): the volumetric positioning errors may be decomposed into linear correlation and nonlinear correlation, and a volumetric positioning error compensation table may be constructed by combining a sag error compensation function of the CNC system. Implementation operations may be described in the following steps (3.1) to (3.3).

Step (3.1): the volumetric positioning errors may be decomposed into the linear correlation and the nonlinear correlation by analyzing a mathematical model between the volumetric positioning errors of the tool center point and the geometric errors of the rotary axes.

The mathematical model between the volumetric positioning errors of the tool center point and the geometric errors of the rotary axes may be represented by:

$P_{error} = P_{actual} - R_{ideal} =$ $T(C) \cdot T(A) \cdot P_t - R(C) \cdot R(A) \cdot P_t = [R(C) \cdot E_C \cdot R(A) \cdot E_A - R(C) \cdot R(A)] \cdot P_t$ Taking a volumetric positioning error projected in an X-direction as an example, the volumetric positioning errors may be decomposed into the linear correlation and the nonlinear correlation as represented by:

$P_{error\_x} = L_{error\_x} + N_{error\_x}$;

Where:

$L_{error\_x} = \delta_x(C)$;

$L_{error\_x} = \delta_x(A)\cos\sigma_C - \delta_y(A)\sin\sigma_C - L\theta_\beta(A)\cos\sigma_A\cos\sigma_C - L\theta_\alpha(A)\cos\sigma_A\sin\sigma_C - L\theta_y(C)\sin\sigma_A\cos\sigma_C - L\theta_\beta(C)\cos\sigma_A - L\theta_y(A)\sin\sigma_A\cos\sigma_C$;

Where $L_{error\_x}$ denotes a linear correlation error term, i.e., a part that is only linearly correlated with geometric errors of a coordinate axis; $L_{error\_x}$ denotes a nonlinear correlation error term, i.e., a part that interacts between the coordinate axis to make the positioning errors change in a nonlinear way.

From the above, it may be seen that a large proportion of the nonlinear correlation error terms are not only related to error values of the rotary axes at a detection point but also to relative positions of the rotary axes as well as a length of the tool. Thus, it may be inferred that the nonlinear correlation error terms are key factors affecting the volumetric positioning errors, and also terms to focus on for compensation.

Step (3.2): compensation of the nonlinear correlation error terms may be realized based on the sag error compensation function of the CNC system. Taking $\delta_x(A)\cos\sigma_C$ as an example, the compensation of the nonlinear correlation error terms may be performed by the following equation:

$S(\delta_x(A)\cos\sigma_C) = S(\cos\sigma_C)S(\delta_x(A))$

Where:

$$S(\cos\sigma_c) = \begin{pmatrix} (T_C^X)_h \\ (T_C^X)_{h+1} \\ \ldots \\ (T_C^X)_{h+m} \end{pmatrix} = \begin{bmatrix} \cos\sigma_{C_1} & 0 & \ldots & 0 \\ 0 & \cos\sigma_{C_2} & \ldots & 0 \\ \ldots & \ldots & \ldots & \ldots \\ 0 & 0 & \ldots & \cos\sigma_{C_m} \end{bmatrix}_{m\times m}$$

$$S(\delta_x(A)) = \begin{pmatrix} (T_A^X)_g \\ (T_A^X)_{g+1} \\ \ldots \\ (T_A^X)_{g+m} \end{pmatrix} = \begin{bmatrix} \delta_x(A)_1 & \delta_x(A)_2 & \ldots & \delta_x(A)_n \\ \delta_x(A)_1 & \delta_x(A)_2 & \ldots & \delta_x(A)_n \\ \ldots & \ldots & \ldots & \ldots \\ \delta_x(A)_1 & \delta_x(A)_2 & \ldots & \delta_x(A)_n \end{bmatrix}_{m\times n};$$

-continued $$(T_a^b)_r = \begin{cases} \$AN\_CEC\_[r, 0] = x_1, \\ \$AN\_CEC\_[r, 1] = x_2, \\ \quad \ldots \ldots, \\ \$AN\_CEC\_[r, F] = x_F, \\ \$AN\_CEC\_INPUT\_AXIS[r] = a, \\ \$AN\_CEC\_OUTPUT\_AXIS[r] = b, \end{cases} ;$$

Where $(T_C^X)_h$ denotes an r-th $T_C^X$ volumetric positioning error compensation table; m denotes that a moving range of a rotary axis C is divided into m portions, $\sigma_{C_1}$ denotes a first angle, $\sigma_{C_2}$ denotes a second angle, and $\sigma_{C_m}$ denotes an m-th angle; h+m denotes m $T_C^X$ volumetric positioning error compensation tables at present; $(T_A^X)_g$ denotes a g-th $T_A^X$ volumetric positioning error compensation table; n denotes that a moving range of a rotary axis A is divided into n parts; and g+m denotes m $T_A^X$ volumetric positioning error compensation tables. $(T_a^b)_r$ denotes an r-th volumetric positioning error compensation table, F denotes that an angular range of a reference coordinate axis is divided into F equal parts, a denotes the reference coordinate axis (an input axis), and b denotes a coordinate axis to be compensated (an output axis). If a and b are consistent, then it is linear correlation compensation. $(x_1, x_2, \ldots, x_F)$ denotes calculated values of coordinates or geometric errors at different positions in F equivalents or geometric error values, and \$AN_CEC_ denotes a special symbol of a CNC system compensation module.

Step (3.3): combined with steps (3.1) and (3.2), the volumetric positioning error compensation table may be constructed based on all constituent elements of the linear correlation error terms and the nonlinear correlation error terms, and the volumetric positioning error compensation file may be constructed, in which the CNC system compensates the entire volumetric positioning errors of the rotary axes.

Figure 5:
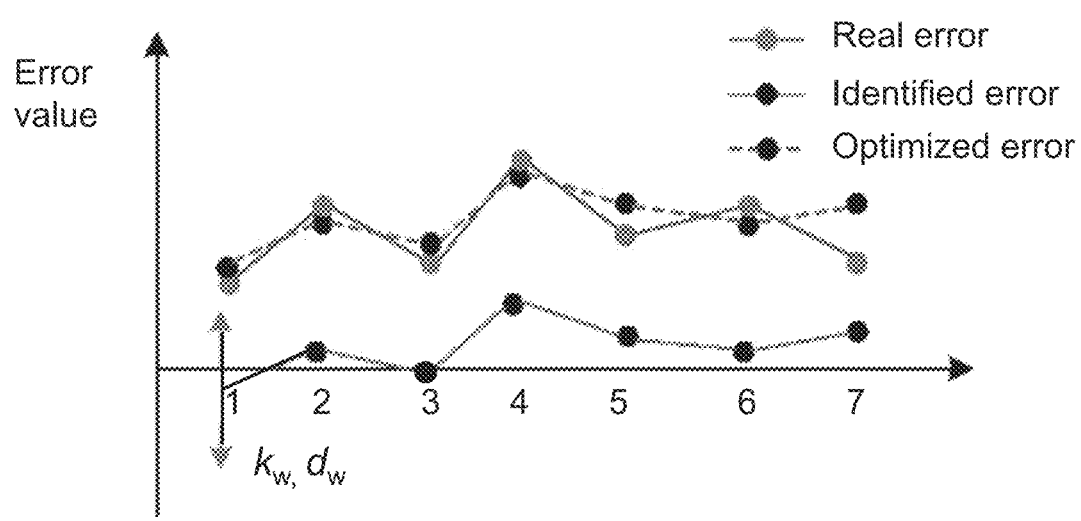
FIG. 5 is a schematic diagram illustrating a principle of correction coefficients for geometric error terms of a CNC machine tool according to some embodiments of the present disclosure.

After constructing the volumetric positioning error compensation file for the rotary axes of the CNC machine tool, the geometric error values of the rotary axes may be filled in sequence. However, a certain detection error or identification error may be introduced in an actual identification process, causing a large deviation between an identified error compensation value and an actual required error compensation value. Therefore, optimization of the geometric error compensation value may be performed through a correction manner. For a traditional correction manner of obtaining an average value from a plurality of inspections and identifications, the efficiency is low while the effect is not necessarily good. In this case, some embodiments of the present disclosure take AK4 trajectories recommended by the ISO standard as the linkage trajectories of the rotary axes of the machine tool, as shown in FIG. 5, to implement the optimization of the geometrical error compensation values in a linkage mode.

Step (4): correction coefficient k and d may be added to the error database obtained in step (2), and correlated with a linkage trajectory positioning error model to establish a compensation value optimization model for the volumetric positioning errors, the compensation value optimization model being configured to optimize the compensation values for the volumetric positioning errors. In some embodiments, the compensation values for the volumetric positioning errors may be optimized by the following steps (4.1) to (4.4).

Step (4.1): the correction coefficient k and d may be added to each error term in the geometric error vector obtained in step (2), which is represented by:

$$e\_Adjust = ke + d;$$

Where e denotes any error term in the geometric error vector, and e_Adjust denotes a corrected error term.

The significance and the principle of correcting the geometric errors may be further illustrated in FIG. 5. The geometric errors (i.e., the identified values of the geometric errors) are searched in upper and lower bounds based on the correction coefficients, where $k_w$ mainly completes scaling adjustment of data, and $d_w$ completes overall offset adjustment of data. The adjustment process may allow approximation of detected positioning errors and simultaneous adjustment of all geometric error terms for accurate error compensation.

An expression of correcting the entire geometric error vectors is represented by:

$$Ebase\_Adjust_{N \times 12} = \begin{bmatrix} \frac{k_w, d_w}{\delta_x(A)_1}, \ldots, \theta_y(A)_1, \delta_x(C)_1, \ldots, \frac{k_w, d_w}{\theta_y(C)_1} \\ \ldots \\ \delta_x(A)_N, \ldots, \theta_y(A)_N, \delta_x(C)_N, \ldots, \theta_y(C)_N \end{bmatrix};$$

Where Ebase_Adjust denotes a corrected error database, $k_w$ and $d_w$ denote correction coefficients required for a w-th error term, the purpose of which is to realize dynamic change of each error term within a certain range, so as to achieve a state closer to a true error.

Figure 6:
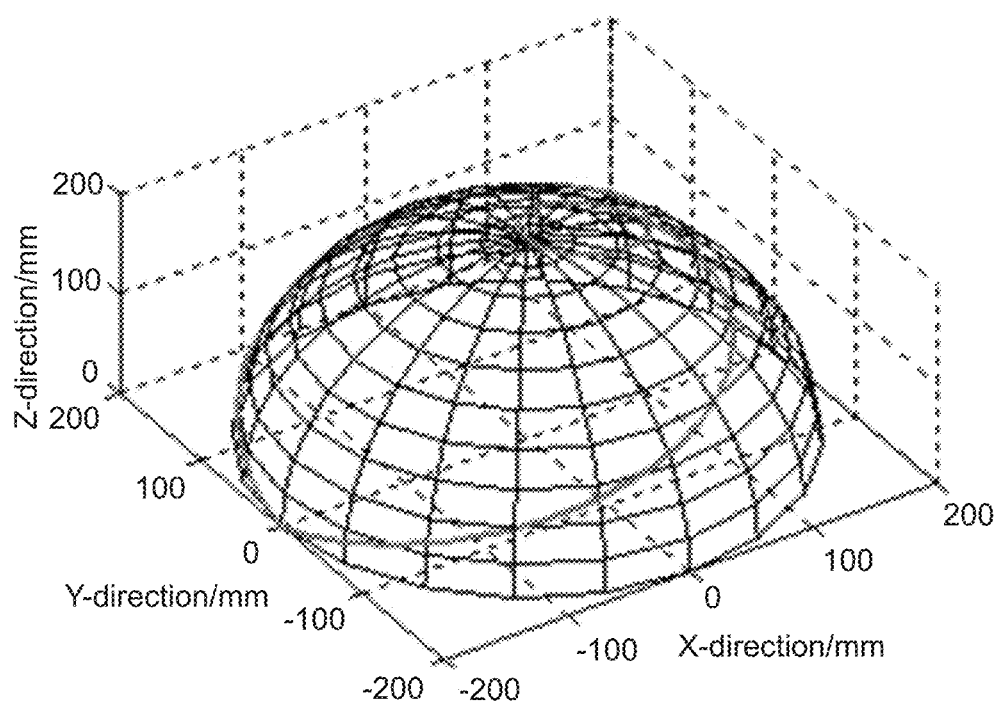
FIG. 6 is a graph illustrating detection of positioning errors of CA linkage trajectories of a CNC machine tool according to some embodiments of the present disclosure.

Step (4.2): the volumetric positioning errors may be calculated in case of linkage trajectories of rotary axes A and C shown in FIG. 6 based on the volumetric positioning error model of the tool center point obtained in step (1), and the volumetric positioning errors may be decomposed into X, Y, and Z-directions under the workpiece coordinate system (which is also referred to as the reference coordinate system of the machine tool), so as to obtain the linkage trajectory positioning error model:

$$P_{error} = \begin{bmatrix} P_{error\_X}(\sigma_A, \sigma_C, E(A), E(C)) \\ P_{error\_Y}(\sigma_A, \sigma_C, E(A), E(C)) \\ P_{error\_Z}(\sigma_A, \sigma_C, E(A), E(C)) \end{bmatrix};$$

Where $\sigma_A$, $\sigma_C$ denote the running angles of the rotary axes under the CNC instruction, E(A) denotes 6 geometric error vectors of a rotary axis A, and E(C) denotes 6 geometric error vectors of a rotary axis C.

After taking adding the correction coefficients to the identified values of the geometric errors by using the mode of step (4), the corrected geometric errors Ebase_Adjust may be obtained, which are then substituted into the linkage trajectory positioning error model to obtain corrected positioning errors in three directions as $P_{error\_X\_Ad}$, $P_{error\_Y\_Ad}$, and $P_{error\_Z\_Ad}$.

Step (4.3): detected positioning error data (i.e., true positioning errors) of the linkage trajectories may be obtained by directly detecting positioning errors of a standard ball center during the linkage of the rotary axes using the detection instrument (e.g., R-TEST).

The true positioning error detected in the X-direction of the reference coordinate system of the machine tool is $\hat{P}_{error\_X}$.

The true positioning error detected in the Y-direction of the reference coordinate system of the machine tool is $\hat{P}_{error\_Y}$.

The true positioning error detected in the Z-direction of the reference coordinate system of the machine tool is $\hat{P}_{error\_Z}$.

In the embodiments, an angular interval of the A-axis is 10° and an annular interval of the C-axis is 30°. For the linkage trajectories in FIG. 6, true positioning errors of 19 detection points may be obtained.

Figure 7A:
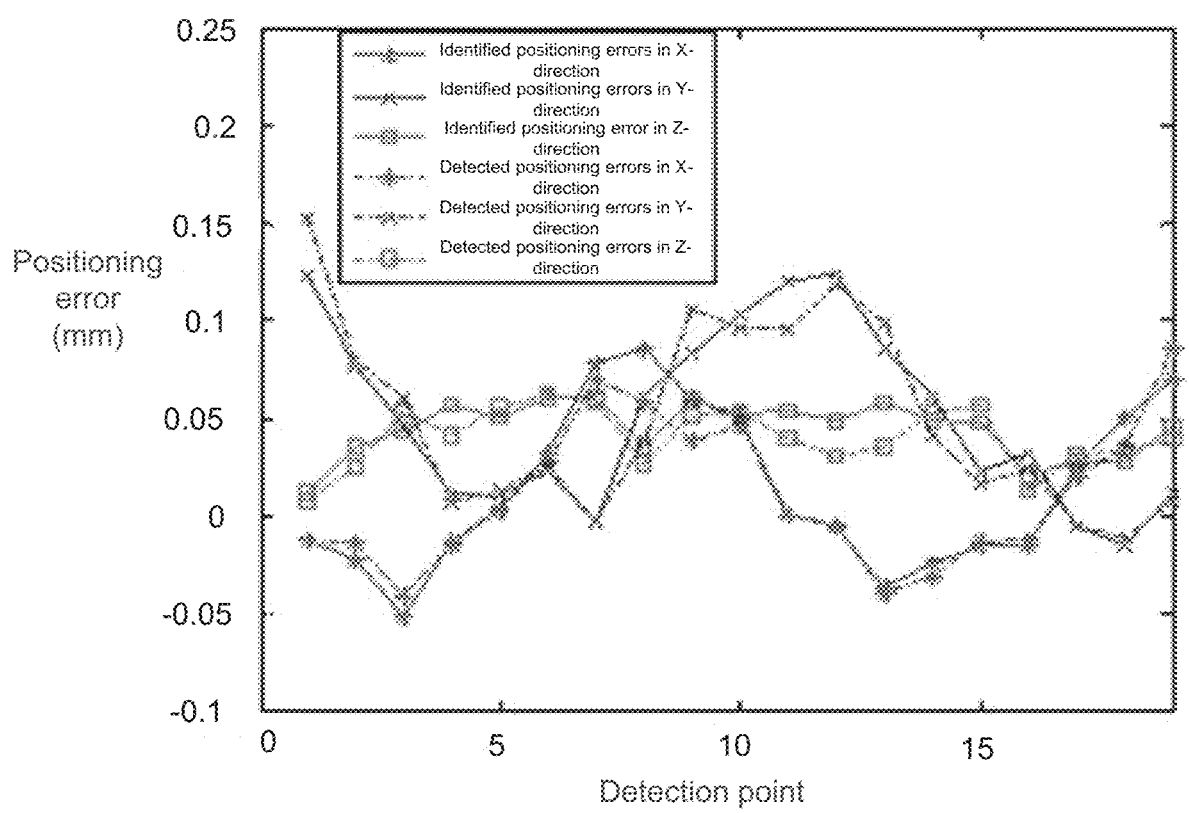
FIG. 7A is a graph illustrating comparison of positioning errors of linkage trajectories and detected positioning errors before fast optimization according to some embodiments of the present disclosure.

Step (4.4): the true positioning errors obtained by the detection instrument may be compared with the corrected positioning errors calculated by the volumetric positioning error model, as shown in FIG. 7A.

A difference between the corrected positioning errors and the true positioning errors may be calculated, and a minimum of a sum of squares of the difference may be taken as an optimization objective to obtain 3 optimization objectives corresponding to 3 directions of the coordinate systems. An optimization model for calculating the optimization objective is represented by:

$$\begin{cases} F_x = (P_{error\_X\_Ad} - \hat{P}_{error\_X})^2 \\ F_y = (P_{error\_Y\_Ad} - \hat{P}_{error\_Y})^2 \\ F_z = (P_{error\_Z\_Ad} - \hat{P}_{error\_Z})^2 \end{cases}$$

Where $F_x$, $F_y$, $F_z$ denote optimization objectives of corresponding geometric error compensation values in case of linkage of the rotary axes, all of which indicate that the corrected positioning errors should be as close as possible to the true positioning errors, so as to achieve the purpose of optimizing the compensation values for the geometric errors.

Figure 7B:
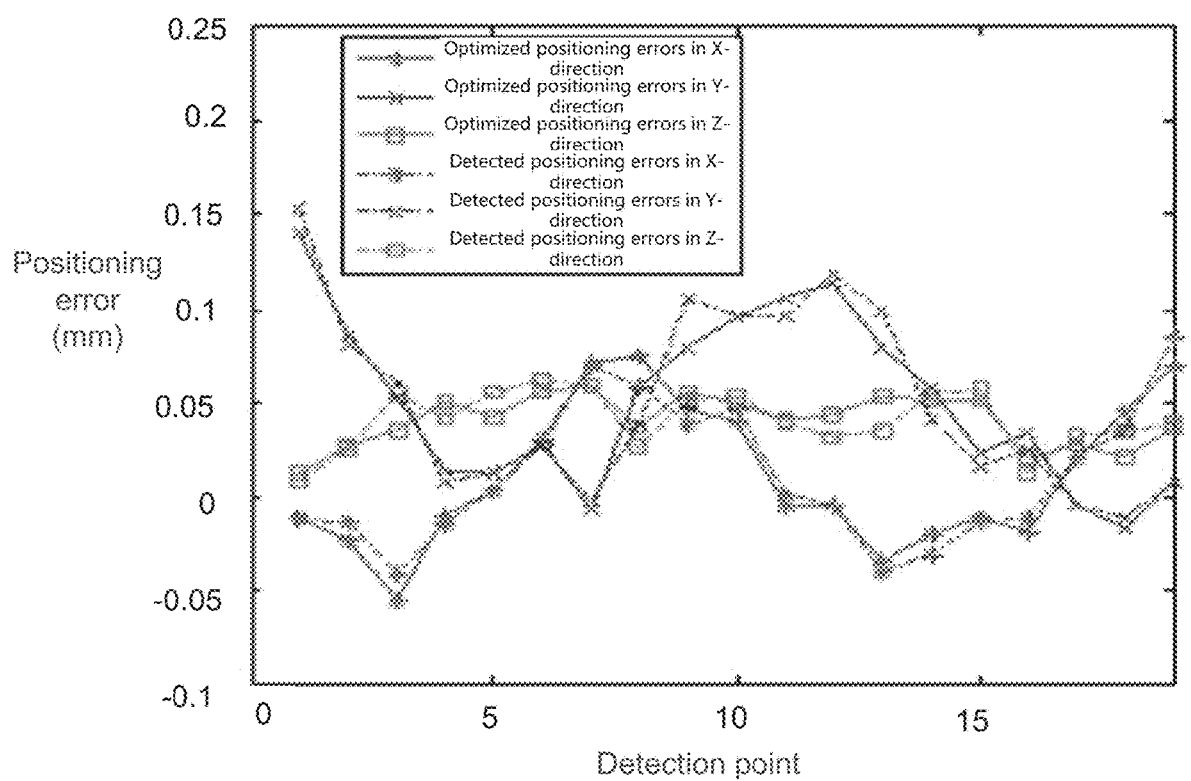
FIG. 7B is a graph illustrating comparison of positioning errors of linkage trajectories and detected positioning errors after fast optimization according to some embodiments of the present disclosure.

Since data in FIG. 7B are all discrete data points, an accurate analytical solution may not be obtained in data processing. An approximate numerical solution may be obtained only by optimization search within a range of values through an intelligent algorithm. Since the 3 optimization objectives are all data comparisons of a same trajectory, and there is no great error weight in one direction, it may be necessary to optimize the 3 optimization objectives simultaneously. In this regard, the present disclosure introduces the NSGAII algorithm for fast optimization search of the correction coefficient k and d.

Step (5): compensation quality control may be performed on the correction coefficient vectors K and D composed of the correction coefficients k and d based on the NSGAII algorithm to realize optimization selection of the correction coefficient vectors, so as to complete an iterative optimization of the compensation values for the volumetric positioning errors.

In some embodiments, the optimization selection of the correction coefficient vectors may be achieved by the following steps (5.1) to (5.6).

Step (5.1): determination of a combination of correction coefficients: the correction coefficient vector K and D may be determined based on the correction coefficient k and d for each geometric error term, which is represented by:

$$\begin{cases} K = [k_1, k_2, \ldots, k_{12}] \\ D = [d_1, d_2, \ldots, d_{12}] \end{cases};$$

Where $k_1, k_2, \ldots, k_{12}, d_1, d_2, \ldots, d_{12}$ denote correction coefficients corresponding to the 12 geometrical errors (which are sorted according to step (2.2)). In this case, an individual particle position, i.e., a vector consisting of [K, D], has 24 vector columns.

Step (5.2): positioning data pre-processing: positioning data of the standard ball center when the linkage trajectories of the rotary axes are forward and backward motions may be collected, and processed three-way positioning error data may be obtained by performing weighted average of the positioning data of the forward and backward motions.

Step (5.3): initialization of NSGAII algorithm: parameters of the NSGAII algorithm may be set, wherein the algorithmic parameters may include a population size M, a total number of external archives R, a crossover operator, a selection operator, a mutation operator, a variable range, a fitness threshold (tolerance), and a maximum number of iterations (Iterations).

Step (5.4): iterative optimization may be performed based on the NSGAII algorithm, which is specifically shown in steps (5.4.1) to (5.4.6) hereinafter.

Step (5.4.1): an initial gene of an individual may be randomly given by a real number encoding manner: the initial gene of the individual may be generated by using down+(up-down)*rand( ) within a given range of correction coefficient variables. Where down denotes a lower bound of a variable, up denotes an upper bound of the variable, and rand( ) denotes a random number between 0 and 1.

Step (5.4.2): each individual in a population may be evaluated: each generated individual may be substituted into the optimization model in step (4), and each optimization objective value may be directly designated as a fitness value to obtain 3 fitness values for each individual.

Step (5.4.3): after a certain sorting of each individual, a non-inferior Pareto solution may be stored in an external archive.

In some embodiments, a non-dominated-sort may be performed on each individual, including performing the non-dominated-sort on each individual to obtain a non-dominated frontier number for each individual, and each layer of non-dominated frontier may include a different number of individuals.

In some embodiments, a crowding distance may be measured and sorted for each individual, including sorting the crowding distances of the individuals on each layer of non-dominated frontier. A crowding distance formula for the individuals in sorting may be represented by:

$$L[u]_d = L[u]_d + (L[u+1]_v - L[u-1]_v)/(f_v^{max} - f_v^{min});$$

Where $L[u]_d$ denotes a crowding distance of a u-th individual, $L[u+1]_v$ denotes a v-th objective function value of a (u+1)th individual, and $f_v^{max}, f_v^{min}$ denote a maximum value and a minimum value of the v-th objective value, respectively.

In some embodiments, storing the non-inferior solution to the external archive may include screening for Pareto solutions from a first frontier until the Pareto solutions are greater than a number Num of the external archive, and then screening may be stopped.

Step (5.4.4): when a count of iteration is less than a maximum count of iterations, updating may be performed according to following operations based on the general evolution rules of the genetic algorithm: an operator may be selected based on a binary tournament, and two genes may be randomly selected from an original parent population for comparison, the priority being given to a smaller sorting rank, and the priority being given to individuals of a same rank with a greater degree of crowding; a crossover operator operation may be performed on the population obtained by step (3) according to a probability; a mutation operator operation may be performed on the population obtained by step (3) according to a probability; and an updated child population may be obtained.

Step (5.4.5): the updated child population may be combined with a child population to form a new population, and step (3) may be iterated to perform secondary evaluation and sorting (i.e., an elite strategy), i.e., better non-inferior solutions may be retained into a next generation.

Step (5.4.6): the external archive may be updated and one cycle may be added, and steps (5.4.2) to (5.4.5) may be iterated.

Step (5.5): an optimization threshold may be determined: according to the parameters set in step (5.3), whether a process of iterative optimization reaches an objective function fitness threshold or the maximum number of iterations may be determined.

Step (5.6): result output: individual genes may be selected from obtained external Pareto non-dominated solutions as values of the correction coefficient vectors K and D.

Step (6): the volumetric positioning error compensation file of the CNC system may be generated based on the correction coefficient vectors and the error database to implement compensation for the volumetric positioning errors. After the process of iterative optimization through the NSGAII algorithm, relatively ideal correction coefficient vector K and D may be obtained. The positioning errors at each position of the linkage trajectories may be calculated by combining with the identified values of the geometric errors of the rotary axes, and a difference De may be made between the positioning errors and the detected positioning errors, and comparison result may be represented in the following table:

|  | X-direction | | Y-direction | | Z-direction | |
| --- | --- | --- | --- | --- | --- | --- |
|  | Maximum value | Standard deviation | Maximum value | Standard deviation | Maximum value | Standard deviation |
| Before optimization | 0.028 | 0.01 | 0.03 | 0.014 | 0.022 | 0.0095 |
| After optimization | 0.016 | 0.008 | 0.026 | 0.011 | 0.019 | 0.0093 |

According to the comparison results in the above table, for the difference between the positioning errors, both the maximum value and the standard deviation are reduced after optimization, which shows an obvious optimization effect.

As shown in FIG. 7B, a further comparison graph between a corrected geometric error and the detected positioning errors is obtained. The corrected geometric error is substituted into the sag error compensation function of the CNC system to generate the volumetric positioning error compensation file for the CNC system, which may realize the compensation for the volumetric positioning errors of the rotary axes of the five-axis CNC machine tool, as represented below:

Step (6.1): combined with the CNC system compensation rules from step (3) and step (5), the volumetric positioning error compensation file for correcting the geometric error terms may be generated in the following format:

$$(T_a^b)_{rj} = \begin{cases} \$AN\_CEC\_[r, 0] = k_j \times e_1 + b_j, \\ \$AN\_CEC\_[r, 1] = k_j \times e_2 + b_j, \\ \dots \dots, \\ \$AN\_CEC\_[r, F] = k_j \times e_F + b_j, \\ \$AN\_CEC\_INPUT\_AXIS[r] = a, \\ \$AN\_CEC\_OUTPUT\_AXIS[r] = b, \end{cases} ;$$

Where $(e_1, e_2, \dots, e_F)$ denotes an F error value of any one of the 12 geometric errors within the angular range, and $k_j$, $b_j$ denote values of the corresponding correction coefficients.

Step (6.2): combined with a nonlinear correlation compensation format and a linear correlation compensation format of step (3), as well as the corrected error database Ebase_Adjust, simultaneous compensation may be completed, which is implemented on the linear correlation error terms and the nonlinear correlation error terms for the positioning errors of the tool center point of the CNC machine tool based on step (6.1).

For the five-axis CNC machine tool, relatively high positioning accuracy may be maintained for a considerable period of time after the compensation of volumetric positioning errors is completed by steps (1) to (6). However, with the increasing use time of machine tool, the positioning accuracy of the machine tool may inevitably decline, so it is necessary to perform regular accuracy inspection.

Step (7): the geometric error compensation data may be updated to the error database, the linkage trajectories of the rotary axes may be periodically detected, and a linkage trajectory positioning error threshold may be set, thereby guaranteeing spatial accuracy of the five-axis CNC machine tool by iteratively implementing detection, optimization, and compensation.

In some embodiments, iteratively implementing detection, optimization, and compensation in step (7) may be realized by steps (7.1) and (7.2) as follows.

Step (7.1): the linkage trajectory positioning error threshold may be set, a detection cycle may be set according to actual use, and the CNC machine tool may be driven to detect the volumetric positioning errors of the linkage trajectories of the rotary axes; if the volumetric positioning errors do not exceed the linkage trajectory positioning error threshold, current geometric error compensation values may be continuously used, otherwise the operation may be performed according to step (7.2);

Step (7.2): a latest geometric error compensation value may be taken as a new geometric error database, and steps (2) to (6) may be iterated to re-compensate with the latest geometric error compensation value to form a volumetric positioning error system guaranteeing integrated cyclic detection, optimization, and compensation.

In some embodiments, the CNC system may determine a detection cycle based on a future compensation time point by predicting the future compensation time point at which error compensation may be required in the future. For example, the CNC system may determine a time interval between two adjacent future compensation time points as a time interval of the detection cycle. Further descriptions regarding determining the future compensation point may be found in FIG. 9 and related descriptions thereof.

Figure 8:
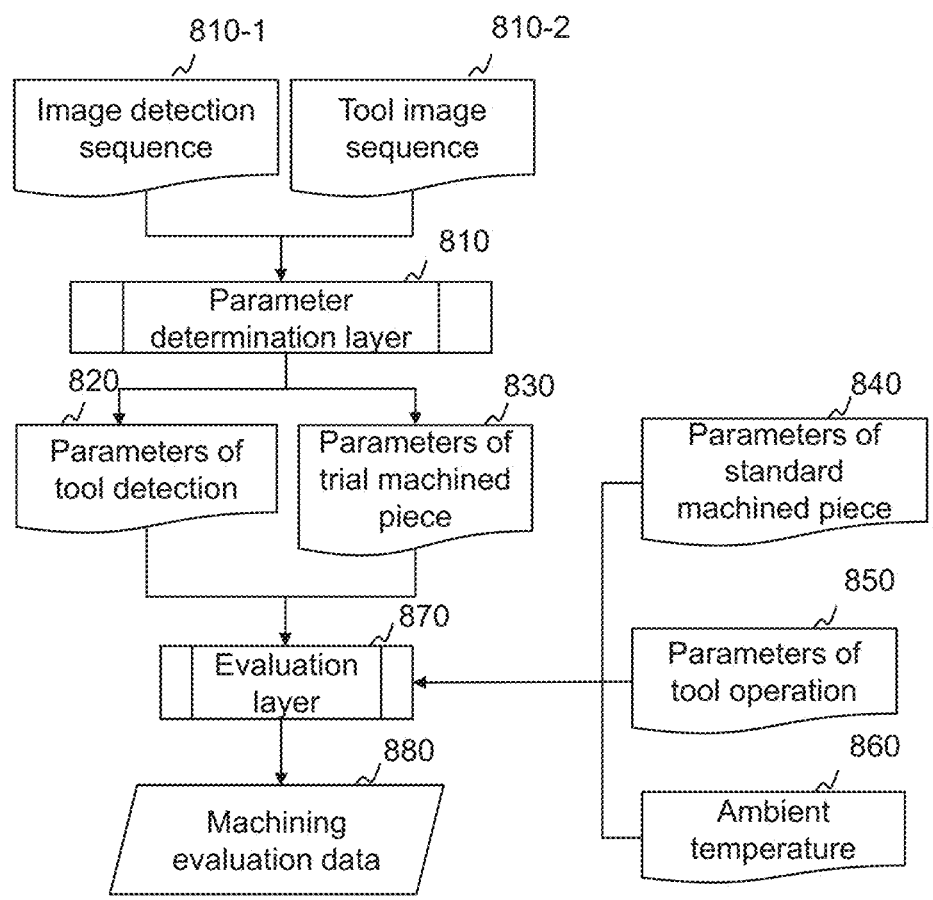
FIG. 8 is a schematic diagram illustrating an exemplary application of a compensation evaluation model according to some embodiments of the present disclosure.

FIG. 8 is a schematic diagram illustrating an exemplary application of a compensation evaluation model according to some embodiments of the present disclosure.

In some embodiments, a CNC system may perform at least one trial machining after each error compensation to obtain a trial machined piece. The trial machined piece may be scored based on a compensation evaluation model to determine an error compensation effect.

The trial machining refers to machining performed to verify the error compensation effect. The trial machined piece is a machined piece obtained after completing the trial machining.

In some embodiments, the CNC system may perform at least one trial machining after each error compensation, so as to avoid an impact on a subsequent compensation effect due to problems of detection instruments.

In some embodiments, the CNC system may also perform at least one trial machining after a preset count of error compensations. In some embodiments, the preset count may be determined based on a priori knowledge or historical data. By intelligently determining the preset count, the compensation effect may be ideal, and an impact of multiple trial machining on production may be avoided.

The error compensation effect refers to an effect of performing error compensation. In some embodiments, the error compensation effect may be in a form of scoring, such as 0-100 points.

The compensation evaluation model refers to a machine learning model. In some embodiments, the compensation evaluation model may be a machine learning model with a customized structure as described below. The compensation evaluation model may also be a machine learning model of other structures, such as a neural network model.

In some embodiments, the compensation evaluation model may include a parameter determination layer 810 and an evaluation layer 870.

In some embodiments, the parameter determination layer 810 may be a convolutional neural network, and the evaluation layer 870 may be a neural network.

In some embodiments, an input of the parameter determination layer 810 may include an image detection sequence 810-1 of the trial machined piece, and a tool image sequence 810-2, and an output of the parameter determination layer 810 may include parameters of the trial machined piece 830 and parameters of tool detection 820.

The image detection sequence 810-1 refers to an image sequence associated with the trial machined piece. For example, the image detection sequence 810-1 may include images of the trial machined piece taken at various angles. A subject in the images of the trial machined piece refers to the trial machined piece.

In some embodiments, the CNC system may obtain the image detection sequence 810-1 based on an image detection unit. The image detection unit refers to a unit for obtaining a high-definition image. For example, the image detection unit may include a visible light camera, an infrared camera, or the like.

The tool image sequence 810-2 refers to an image sequence associated with a tool. For example, the tool image sequence 810-2 may include tool images taken from various angles when the tool is not running and tool images taken continuously when the tool is running. A subject in the tool images refers to the tool.

In some embodiments, the CNC system may obtain the tool image sequence 810-2 based on the image detection unit.

The parameters of the trial machined piece 830 refer to parameters related to a state of the trial machined piece. For example, the parameters of trial machined piece 830 may include a size, a size of a groove, a depth of the groove of the trial machined piece, etc.

The parameters of tool detection 820 refer to parameters related to a state of the tool. For example, the parameters of tool inspection 820 may include a tool size, a wear condition, etc. The wear condition may be expressed quantitatively.

The parameters of trial machined piece 830 may be obtained after image recognition of the image detection sequence 810-1. The parameters of tool detection 820 may be obtained after image recognition of the tool image sequence 810-2. Ways to perform image recognition include, but are not limited to, the machine learning model, etc.

In some embodiments, an input of the evaluation layer 870 may include the parameters of trial machined piece 830, parameters of a standard machined piece 840, the parameters of tool detection 820, parameters of tool operation 850, and an ambient temperature 860, and an output of the evaluation layer 870 may be machining evaluation data 880.

The parameters of the standard machined piece 840 refer to parameters related to a state of the standard machined piece. The standard machined piece is a component that is produced to specifications and has a standard shape. In some embodiments, the parameters of the standard machined piece 840 may be obtained in a preset manner.

In some embodiments, the parameters of tool operation 850 may include a tool speed, an advance speed, a cutting angle, etc. In some embodiments, the CNC system may obtain the parameters of tool operation 850 by querying a database. The parameters of tool operation parameter may be pre-stored in the database. In some embodiments, the CNC system may detect the parameters of tool operation by using a related device (e.g., a rotational speed sensor, a shift sensor, an angle sensor, etc.).

In some embodiments, the CNC system may obtain the ambient temperature 960 through a temperature sensing device. The temperature sensing device may include a thermocouple temperature sensor, a thermistor temperature sensor, etc.

The machining evaluation data 880 refers to an evaluation of the effect of the trial machining. In some embodiments, the machining evaluation data 880 may include a machining problem and a compensation effect score during the trial machining. The machining problem may include a dimensional deviation, a groove deviation, etc. The compensation effect score refers to a score of the effect of error compensation on the trial machined piece. The higher the compensation effect score, the better the effect of error compensation on the trial machined piece.

In some embodiments, an output of the parameter determination layer 810 may be the input of the evaluation layer 870, and the parameter determination layer 810 and the evaluation layer 870 may be obtained by joint training of first training samples with first labels.

In some embodiments, the first training samples may include a sample image inspection sequence, a sample tool image sequence, sample standard machined piece parameters, sample tool operation parameters, and a sample ambient temperature, and the first labels may include sample machining evaluation data corresponding to the first training samples.

In some embodiments, the first training samples may be obtained based on historical data. The machining problem in the first labels may be obtained based on a historical trial machining process, and the compensation effect score may be determined based on a difference between the parameters of the trial machined piece (e.g., the size, the size of the groove, the depth of the groove, etc.) and the parameters of the standard machined piece (e.g., the size, the size of the groove, the depth of the groove, etc.), and the larger the difference, the lower the compensation effect score.

An exemplary process of joint training may include the following operations. The parameters of the trial machined piece and the parameters of tool detection output from an initial parameter determination layer may be obtained by inputting the sample image detection sequence and the sample tool image sequence into the initial parameter determination layer; and the machining evaluation data output from an initial evaluation layer may be obtained by inputting the parameters of the trial machined piece and the parameters of tool detection output from the initial parameter determination layer as training sample data, and the sample standard machined piece parameters, the sample tool operation parameters, and the sample ambient temperature into the initial evaluation layer. A loss function may be constructed based on the first labels and the machining evaluation data output from the initial evaluation layer, and parameters of the initial parameter determination layer and parameters of the initial evaluation layer may be synchronously updated. A trained parameter determination layer and a trained evaluation layer may be obtained by parameter updating.

In some embodiments, the CNC system may determine the compensation effect score for at least one trial machined piece by scoring the at least one trial machined piece with the compensation evaluation model; and based on the compensation effect score for the at least one trial machined piece, determine the error compensation effect by calculating a mean value or a variance value.

In some embodiments of the present disclosure, a plurality of times of trial machining may be performed after each error compensation, and the compensation effect scores of a plurality of trial machined pieces may be statistically verified to determine the error compensation effect of the CNC system, which effectively excludes the influence of accidental factors and unstable factors on the error compensation, thereby realizing accurate detection of the compensation effect and avoiding the influence of possible problems of the detection instruments on the error compensation. The image detection sequence of the trial machined piece and the tool image sequence may be processed through the compensation evaluation model, a law may be found from the image detection sequences of the plurality of trial machined pieces by using a self-learning ability of the machine learning model, and a correlation between the machining evaluation data and the image detection sequence of the trial machined piece may be obtained, thereby improving accuracy and efficiency of determining the machining evaluation data.

In some embodiments, in response to the error compensation effect not meeting a preset condition, the CNC system may re-perform the volumetric positioning error compensations.

In some embodiments, the preset condition may be that the error compensation effect is greater than a compensation threshold. For example, the preset condition may be that a mean value of the compensation effect score is greater than a mean threshold, or a variance value of the compensation effect score is less than a variance threshold, etc. The compensation threshold may be manually determined.

In some embodiments, the CNC system may inspect each item before re-compensating the volumetric positioning errors. For example, items to be inspected may include the tool, the detection instrument, and a tool component.

In some embodiments, the CNC system may construct a problem feature vector based on the machining problem, the compensation effect score, the parameters of tool detection, and tool operation data to determine a detection item by vector matching.

In some embodiments, the CNC system may determine, based on the problem feature vector, a reference feature vector in the vector database that meets the preset condition, and determine the reference feature vector that meets the preset condition as a correlation feature vector; and determine a final detection item from a reference detection item corresponding to the correlation feature vector. The vector database may include a plurality of reference feature vectors and corresponding reference detection items. The reference feature vector may be constructed based on a historical machining problem, a historical compensation effect score, a historical tool detection parameter, and historical tool operation data. The reference detection item corresponding to the reference feature vector may be determined based on historical detection data. The preset condition refers to a determination condition used to determine the correlation feature vector. In some embodiments, the preset condition may include that a vector distance is less than a distance threshold, a vector distance is minimum, etc.

In some embodiments, the CNC system may re-perform the volumetric positioning error compensation when a problem occurs to the detection instrument and the detection instrument is adjusted. When an other problem occurs (e.g., a problem to the tool) and corresponding adjustment is made, the CNC system may re-perform the trial machining, and determine whether to re-perform the volumetric positioning error compensation based on whether a new error compensation effect for the trial machined piece meets the preset condition.

In some embodiments of the present disclosure, by re-performing the volumetric positioning error compensation in response to the error compensation effect not meeting the preset condition, the machining accuracy may be improved in an automated and intelligent manner to avoid an accumulation of errors that affects the machining quality of the machined piece.

In some embodiments, the CNC system may improve the calculation accuracy of error compensation calculation when re-performing the volumetric positioning error compensation.

In some embodiments, the CNC system may increase a count of divisions of the motion strokes when re-performing the volumetric positioning error compensation.

In some embodiments of the present disclosure, when re-performing the volumetric positioning error compensation, the count of divisions of the motion strokes may be increased, so that the calculation process of the error compensation may be more refined, thereby further improving the compensation effect.

Figure 9:
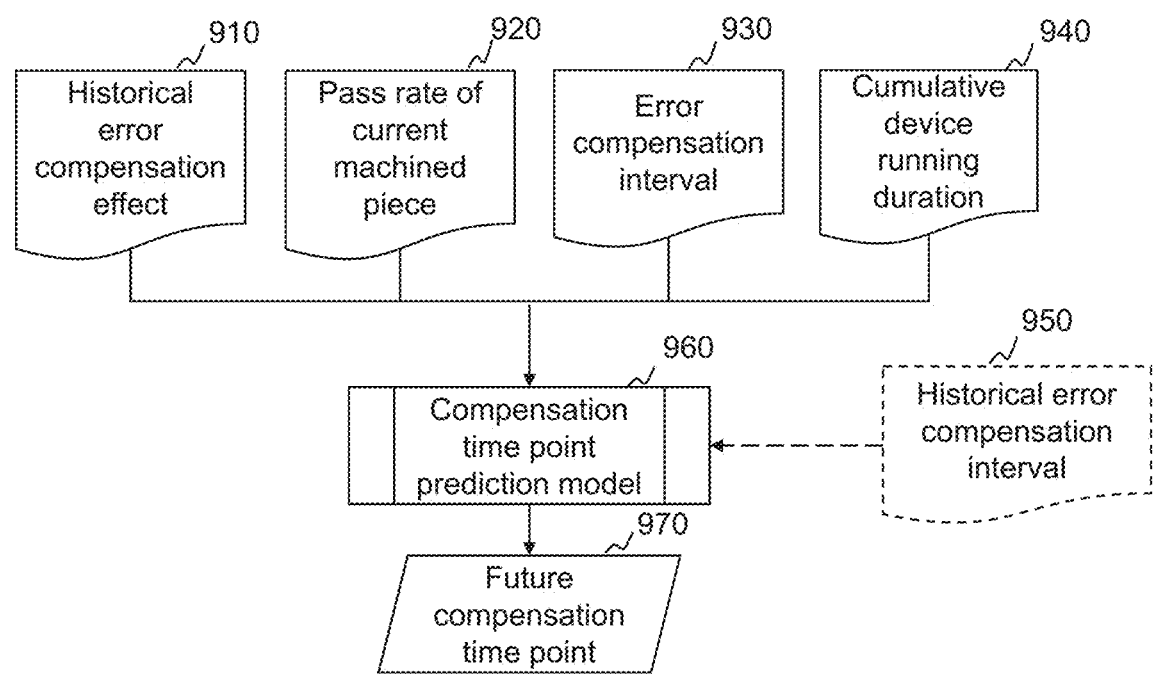
FIG. 9 is a schematic diagram illustrating an exemplary application of a compensation time point prediction model according to some embodiments of the present disclosure.

FIG. 9 is a schematic diagram illustrating an exemplary application of a compensation time point prediction model according to some embodiments of the present disclosure.

In some embodiments, the CNC system may predict a future compensation time point 970 at which error compensation may be required in the future.

The future compensation time point 970 refers to a predicted time point at which the volumetric positioning error compensation may be re-performed.

In some embodiments, a CNC system may determine the future compensation time point 970 based on a compensation time point prediction model 960.

The compensation time point prediction model 960 may be a machine learning model, such as a deep neural network, a convolutional neural network, or the like, or any combination thereof.

In some embodiments, an input of the compensation time point prediction model 960 may include at least one historical error compensation effect 910, a pass rate of a current machined piece 920, an error compensation interval 930, and a cumulative device running duration 940, and an output of the compensation time point prediction model 960 may include the future compensation time point 970.

The historical error compensation effect 910 refers to an error compensation effect obtained after performing error compensation over a historical time period. The historical time period refers to a time period prior to a current time (i.e., a time point at which the prediction is performed using the compensation time point prediction model). Each historical error compensation effect 910 may correspond to a statistical feature (e.g., a mean value, a variance value, etc.) of the compensation effect score of a plurality of machined pieces obtained over the historical time piece. One or more historical time intervals may be included in the historical time period. A time length of each historical time period and each historical time interval may be either a system default or a manual preset value.

The pass rate of the current machined piece 920 refers to a pass rate of a plurality of machined pieces after error compensation according to a same geometric error compensation value. In some embodiments, the pass rate of the current machined piece 920 may be determined based on a pass criterion. For example, a ratio of a count of the machined pieces in the plurality of machined pieces that meet the pass criterion to a total count of machined pieces may be determined as the pass rate. The pass criterion may be that a dimension of the machined piece and a size or a depth of a groove meet requirements of the standard machined piece and are within tolerance.

The error compensation interval 930 refers to a time interval between a last error compensation and a current error compensation. The CNC system may determine the error compensation interval 930 based on a time point of the last error compensation and the current time point.

The cumulative device running duration 940 refers to a duration of the five-axis CNC machine tool from a start time of operation to the current time point. The CNC system may determine the cumulative device running duration 940 based on the start time of operation of the five-axis CNC machine tool and the current time point.

In some embodiments, an input of the compensation time point prediction model 960 may further include a historical error compensation interval 950.

The historical error compensation interval 950 refers to a time interval between two adjacent error compensations in a historical time period. The CNC system may determine the historical error compensation interval 950 based on historical data. Further description regarding the historical time period may be found hereinabove.

Considering that the shorter the error compensation interval, the closer the future compensation time point to the current time point. By inputting the historical error compensation interval as an output of the compensation time point prediction model, a determined future compensation time point may be more comprehensive and accurate.

In some embodiments, the compensation time point prediction model 960 may be obtained by training of second training samples with second labels. The second training samples may include a sample historical error compensation effect before a sample time point, a pass rate of a sample machined piece, a sample error compensation interval, and a sample cumulative device running duration. The second labels may be a sample compensation time point after the sample time point. The second training samples may be obtained based on the historical data. The second label may be obtained based on historical detection data. For example, the CNC machine tool may be driven daily to detect the volumetric positioning errors until the volumetric positioning errors at a time point exceed the linkage trajectory positioning error threshold, and the time point may be recorded as the second label.

When the input of the compensation time point prediction model also includes the historical error compensation interval, the second training samples may also include a sample historical error compensation interval.

An exemplary training process may include following operations. A plurality of second training samples with second labels may be input into an initial compensation time point prediction model, a loss function may be constructed from the second labels and results of the initial compensation time point prediction model, and parameters of the initial compensation time point prediction model may be iteratively updated based on the loss function. When the loss function of the initial compensation time point prediction model meets a preset condition, model training may be completed, and a trained compensation time point prediction model may be obtained. The preset condition may be that the loss function converges, a count of iterations reaches a threshold, etc.

If the detection cycle is too long, it may lead to too much error accumulation, affecting the machining accuracy. But if the detection cycle is too short, it may make a detection and compensation process cumbersome, causing a waste of time. In some embodiments of the present disclosure, by predicting the future compensation time point at which error compensation is required in the future, errors and waste caused by a fixed detection cycle may be avoided, and accuracy of error compensation may be improved to ensure the machining accuracy and to save time and resources. At least one historical error compensation effect, the pass rate of the current machined piece, the error compensation interval, and the cumulative device running duration may be processed through the compensation time point prediction model, a law may be found from a plurality of historical error compensation effects by using a self-learning ability of the machine learning model, and a correlation between the future compensation time point and the historical error compensation effect may be obtained, thereby improving the accuracy and efficiency of determining the future compensation time point.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. In addition, some features, structures, or characteristics of one or more embodiments in the present disclosure may be properly combined.

Furthermore, the recited order of processing elements or sequences, or the use of numbers, letters, or other designations therefore, is not intended to limit the claimed processes and methods to any order except as may be specified in the claims. Although the above disclosure discusses some embodiments of the invention currently considered useful by various examples, it should be understood that such details are for illustrative purposes only, and the additional claims are not limited to the disclosed embodiments. Instead, the claims are intended to cover all combinations of corrections and equivalents consistent with the substance and scope of the embodiments of the invention. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that object of the present disclosure requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/ or the like, referenced herein is hereby incorporated herein by this reference in its entirety for all purposes. History application documents that are inconsistent or conflictive with the contents of the present disclosure are excluded, as well as documents (currently or subsequently appended to the present specification) limiting the broadest scope of the claims of the present disclosure. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method of optimization and compensation for volumetric positioning errors of rotary axes of a five-axis computer numerical control (CNC) machine tool, comprising:

(1) establishing a volumetric positioning error model for the rotary axes of the five-axis CNC machine tool based on 12 geometric errors of the rotary axes, wherein the rotary axes at least include a rotary axis A that rotates around an X-axis and a rotary axis C that rotates around a Z-axis;

(2) completing an identification of the 12 geometric errors of the rotary axes based on instrument detection data, and forming an error database containing 12 geometric error vectors;

obtaining a geometric error identification result by performing the identification of the 12 geometric errors using a detection instrument and a relevant identification algorithm based on the volumetric positioning error model established for the rotary axes of the five-axis CNC machine tool based on step (1); wherein each of the 12 geometric error vectors is an error vector combined by 6 geometric errors identified for each rotary axis of the rotary axis A and the rotary axis C:

$$E_{1\times12} = \left[\underbrace{\delta_x(A), \delta_y(A), \delta_z(A), \theta_\alpha(A), \theta_\beta(A), \theta_\gamma(A),}_{6} \underbrace{\delta_x(C), \delta_y(C), \delta_z(C), \theta_\alpha(C), \theta_\beta(C), \theta_\gamma(C)}_{6}\right];$$

wherein $(\delta_x(A), \delta_y(A), \delta_z(A))$ denotes a displacement error of the rotary axis A along an X-direction, a Y-direction, and a Z-direction, respectively, $(\delta_x(C), \delta_y(C), \delta_z(C))$ denotes a displacement error of the rotary axis C along the X-direction, the Y-direction, and the Z-direction, respectively, $(\theta_\alpha(A), \theta_\beta(A), \theta_\gamma(A))$ denotes an angular error of the rotary axis A around the X-axis, a Y-axis, and the Z-axis, respectively, and $(\theta_\alpha(C), \theta_\beta(C), \theta_\gamma(C))$ denotes an angular error of the rotary axis C around the X-axis, the Y-axis, and the Z-axis, respectively;

the 12 geometric errors are related to a motion position, and each of the 12 geometric errors is turned into a vector related to the motion position, i.e., when a motion stroke of each rotary axis is divided into N equal parts, a same error element is slightly different at different rotation angle positions, which is noted as:

$$Ebase_{N\times 12} = \begin{bmatrix} \delta_x(A)_1, \ldots, \theta_y(A)_1, \delta_x(C)_1, \ldots, \theta_y(C)_1 \\ \ldots \\ \delta_x(A)_N, \ldots, \theta_y(A)_N, \delta_x(C)_N, \ldots, \theta_y(C)_N \end{bmatrix};$$

where $Ebase_{N\times 12}$ denotes a matrix of N rows and 12 columns, which is a geometric error database of the five-axis CNC machine tool;

(3) decomposing the volumetric positioning errors of the rotary axes into linear correlation and nonlinear correlation, and constructing a volumetric positioning error compensation table of the rotary axes of a CNC system by combining with a sag error compensation function of the CNC system;

(4) adding correction coefficients k and d to the geometric error database obtained in step (2) and correlating the correction coefficients k and d with the volumetric positioning error model for the rotary axes to establish a compensation data optimization model for the volumetric positioning errors of the five-axis CNC machine tool;

(5) carrying out compensation quality control on correction coefficient vectors K and D composed of the correction coefficients k and d based on a non-dominated sorting genetic algorithm (NSGAII algorithm) so as to complete an iterative optimization of compensation data to realize an optimization of the correction coefficients;

(6) generating a volumetric positioning error compensation file for the CNC system by using the correction coefficient vectors obtained in step (5) and the error database containing 12 geometric errors, so as to complete compensation of the 12 geometric errors of the rotary axes of the five-axis CNC machine tool; and (7) updating geometric error correction data to the error database, and periodically detecting linkage trajectories of the rotary axes, and setting a linkage trajectory positioning error threshold, thereby guaranteeing spatial accuracy of the five-axis CNC machine tool by iteratively implementing detection, optimization, and compensation.

2. The method of claim 1, wherein a process of establishing the volumetric positioning error model of a tool center point caused by the 12 geometric errors of the rotary axes of the five-axis CNC machine tool in step (1) includes:

for each of the rotary axes, due to an effect of the 12 geometric errors of the rotary axis, an actual motion matrix of each of the rotary axes is:

$$T_i = R(i) \cdot E_i, i = A, B, C$$

where $T_i$ ($T_i = T(i)$) denotes an actual motion transformation matrix of i axis, R(i) denotes a theoretical motion transformation matrix of the i axis, and E (i) denotes a geometric error matrix, which are specifically described as follows:

$$R(A) = \begin{bmatrix} 1 & 0 & 0 & 0 \\ 0 & \cos A & -\sin A & 0 \\ 0 & \sin A & \cos A & 0 \\ 0 & 0 & 0 & 1 \end{bmatrix}, R(B) = \begin{bmatrix} \cos B & 0 & \sin B & 0 \\ 0 & 1 & 0 & 0 \\ -\sin B & 0 & \cos B & 0 \\ 0 & 0 & 0 & 1 \end{bmatrix},$$

$$R(C) = \begin{bmatrix} \cos C & -\sin C & 0 & 0 \\ \sin C & \cos C & 0 & 0 \\ 0 & 0 & 1 & 0 \\ 0 & 0 & 0 & 1 \end{bmatrix},$$

$$E_i = \begin{bmatrix} 1 & -\theta_y(i) & \theta_\beta(i) & \delta_x(i) \\ \theta_y(i) & 1 & \theta_\alpha(i) & \delta_y(i) \\ -\theta_\beta(i) & \theta_\alpha(i) & 1 & \delta_z(i) \\ 0 & 0 & 0 & 1 \end{bmatrix}, i = A, B, C;$$

where A, B, C denote a rotating angle in a CNC instruction, ($\delta_x(i)$, $\delta_y(i)$, $\delta_z(i)$) denotes a displacement error of the i axis along the X-direction, the Y-direction, and the Z-direction, respectively, and ($\theta_\alpha(i)$, $\theta_\beta(i)$, $\theta_\gamma(i)$) denotes an angular error of the i axis around the X-axis, the Y-axis, and the Z-axis, respectively,;

since the five-axis CNC machine tool has only two rotary axes involved in the motion, a kinematic relationship of the tool center point in a presence of errors in linkage operation of the rotary axis C and the rotary axis A as follows:

$$P_{actual} = T(C) \cdot T(A) \cdot P_t;$$

where $P_{actual}$ denotes actual coordinates of the tool center point under the workpiece coordinate system, $P_t = [0\ 0\ -L\ 1]^T$; $P_t$ denotes coordinates of the tool center point under a tool coordinate system, L denotes a length of the tool, and T denotes the matrix transpose operator symbol; ignoring the geometric error matrix for the above equation, which is a theoretical motion mode, the kinematic relationship of the tool center point in an ideal case is obtained as:

$$P_{ideal} = R(C) \cdot R(A) \cdot P_t;$$

where $P_{ideal}$ is theoretical coordinates of the tool center point under the workpiece coordinate system;
the volumetric positioning error model of the rotary axes is further represented by:

$$P_{error} = P_{actual} - P_{ideal};$$

by substituting the actual motion matrix and the geometric error matrix $E_i$, the volumetric positioning error model is further represented by:

$$P_{error} = \begin{bmatrix} \delta_x(A)\cos\sigma_C - \delta_y(A)\sin\sigma_C - L\theta_\beta(A)\cos\sigma_A \\ \cos\sigma_C - L\theta_\alpha(A)\cos\sigma_A\sin\sigma_C - \\ L\theta_y(C)\sin\sigma_A\cos\sigma_C - L\theta_\beta(C)\cos\sigma_A - \\ L\theta_y(A)\sin\sigma_A\cos\sigma_C + \delta_x(C) \\ \delta_y(C) + \delta_x(A)\sin\sigma_C + L\theta_\alpha(C)\cos\sigma_A - \\ L\theta_y(A)\sin\sigma_A\sin\sigma_C + \delta_y(A)\cos\sigma_C + \\ L\theta_\alpha(A)\cos\sigma_A\cos\sigma_C - L\theta_y(C)\sin\sigma_A\sin\sigma_C - \\ L\theta_\beta(A)\cos\sigma_A\cos\sigma_C \\ L\theta_\beta(A)\sin\sigma_A\sin\sigma_C + L\theta_\alpha(C)\sin\sigma_A\cos\sigma_C + \\ L\theta_\alpha(A)\sin\sigma_A + \delta_z(C) + \delta_z(A) \\ 0 \end{bmatrix}$$

3. The method of claim 2, wherein the detection instrument in the step (2) is an R-TEST or ball-bar.

4. The method of claim 3, wherein the constructing the volumetric positioning error compensation table of the CNC system in step (3) includes:

(3.1) dividing the volumetric positioning errors into the linear correlation and the nonlinear correlation by analyzing a mathematical model between the volumetric positioning errors of the tool center point and the 12 geometric errors of the rotary axes;

(3.2) realizing compensation of nonlinear correlation error terms based on the sag error compensation function of the CNC system;

(3.3) combining steps (3.1) and (3.2), establishing the volumetric positioning error compensation table based on all constituent elements of linear correlation error terms and the nonlinear correlation error terms, and constructing the volumetric positioning error compensation file for the CNC system to compensate the volumetric positioning errors of the rotary axes.

5. The method of claim 4, wherein the process of establishing the compensation data optimization model for the volumetric positioning errors of the CNC machine tool in step (4) includes:

(4.1) adding the correction coefficients k and d to each error term of the 12 geometric error vectors obtained in step (2);

(4.2) decomposing the volumetric positioning error model obtained in step (1) for the tool center point, which is the volumetric positioning errors of linkage of the rotary axes A and C in the five-axis CNC machine tool, in the X, Y and Z directions under a reference coordinate system of a machine tool, obtaining corrected geometric errors by adding the correction coefficients to the identified 12 geometric errors by means of step (4), and then obtaining corrected positioning errors in the X Y, and Z directions by substituting the corrected geometric errors into linkage trajectory positioning errors of the rotary axes;

(4.3) obtaining true positioning error data of the machine tool by directly detecting a positioning error of a standard ball center during the linkage of the rotary axes using the detection instrument; and (4.4) calculating a difference between the corrected positioning errors in step (4.2) and the true positioning errors in step (4.3), and taking a smallest sum of squares of the difference as an optimization objective to obtain 3 optimization objectives.

6. The method of claim 5, wherein the step (5) includes:

(5.1) a combination of the correction coefficients: determining the correction coefficient vectors K and D by adding the correction coefficients k and d for each geometric error term;

(5.2) positioning data pre-processing: collecting positioning data of the standard ball center when the linkage trajectories of the rotary axes are forward and backward motions, and obtaining processed three-way positioning error data by performing weighted average of the positioning data of the forward and backward motions;

(5.3) initialization of the NSGAII algorithm and setting of parameters of the NSGAII algorithm: the algorithmic parameters include a population size M, a total number of external archives R, a crossover operator, a selection operator, a mutation operator, a variable range, a fitness threshold (tolerance), and a maximum number of iterations (Iterations);

(5.4) iterative optimization of the NSGAII algorithm;

(5.5) determining an optimization threshold: according to the parameters set in step (5.3), determining whether a process of the iterative optimization reaches an objective function fitness threshold or the maximum number of iterations; and (5.6) result output: selecting individual genes from obtained external Pareto non-dominated solutions as values of the correction coefficient vectors K and D according to a principle.

7. The method of claim 6, wherein the process of performing the iterative optimization of the NSGAII algorithm in step (5.4) includes:

(5.4.1) selecting a real number coding method to randomly give initial genes of each individual: generating the initial genes of an individual by using down+(up-down)*rand( ) within a range of a given correction coefficient variable;

wherein down represents a lower bound of the correction coefficient variable, up represents an upper bound of the correction coefficient variable, and rand( )is a random number between 0 and 1;

(5.4.2) evaluating the each individual in a population: substituting each generated individual into the optimization model in step (4), and directly using each optimization objective value as a fitness value to obtain 3 fitness values corresponding to the each individual;

(5.4.3) storing non-inferior Pareto solutions in the external archives after sorting the each individual;

(5.4.4) using generalized evolutionary rules of the genetic algorithm when a count of cycles is less than a maximum count of cycles;

(5.4.5) combining an updated offspring population with an original parent population to form a new population, and repeating step (5.4.3) to perform secondary evaluation and sorting, i.e., retaining better non-inferior solutions to a next generation; and (5.4.6) updating the external archives and adding one cycle, and iterating the step (5.4.2) to the step (5.4.5).

8. The method of claim 7, wherein the process of compensating for volumetric positioning errors of the five-axis CNC machine tool in step (6) includes:

(6.1) generating the volumetric positioning error compensation file of the corrected geometric errors by combining the contents of steps (3) and (5); and (6.2) accomplishing simultaneous compensation of the linear correlation error terms and the nonlinear correlation error terms of the positioning errors of the tool center point of the five-axis CNC machine tool based on the step (6.1) according to corrected error database of the rotary axes.

9. The method of claim 8, wherein a process of the iteratively implementing detection, optimization, and compensation in step (7) includes:

(7.1) setting the linkage trajectory positioning error threshold, setting a detection cycle duration according to an actual use, and driving the CNC machine tool to detect the linkage trajectory positioning error; if the linkage trajectory positioning error threshold is not exceeded, continuing to use, otherwise performing according to step (7.2); and (7.2) taking a latest geometric error compensation data as a new error database, and iterating steps (2) to (6) to re-compensate with the latest geometric error compensation data to form a volumetric positioning error system guaranteeing integrated cyclic detection, optimization, and compensation.

* * * * *